(12) United States Patent
Fumarolo et al.

(10) Patent No.: US 12,041,533 B2
(45) Date of Patent: Jul. 16, 2024

(54) SYSTEM AND METHOD FOR CONFIGURING A PORTABLE COMMUNICATION SYSTEM

(71) Applicant: Futurecom Systems Group, ULC, Vaughn (CA)

(72) Inventors: Arthur L. Fumarolo, Schaumburg, IL (US); Nebojsa Ljumovic, Etobicoke (CA)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 325 days.

(21) Appl. No.: 17/741,147

(22) Filed: May 10, 2022

(65) Prior Publication Data

US 2023/0370953 A1     Nov. 16, 2023

(51) Int. Cl.
| | | |
|---|---|---|
| H04W 48/10 | (2009.01) | |
| H04B 7/155 | (2006.01) | |
| H04W 84/20 | (2009.01) | |
| H04W 92/10 | (2009.01) | |

(52) U.S. Cl.
CPC ............ *H04W 48/10* (2013.01); *H04B 7/155* (2013.01); *H04W 84/20* (2013.01); *H04W 92/10* (2013.01)

(58) Field of Classification Search
None
See application file for complete search history.

(56) References Cited

U.S. PATENT DOCUMENTS

| | | | |
|---|---|---|---|
| 1,584,220 | A | 5/1926 | Farkouh |
| 2,486,536 | A | 11/1949 | Olson |
| 3,475,700 | A | 10/1969 | Ertel |
| 3,711,793 | A | 1/1973 | Stachejko |
| 4,480,338 | A | 10/1984 | Dobrovolny |
| 4,817,200 | A | 3/1989 | Tanbakuchi |

(Continued)

FOREIGN PATENT DOCUMENTS

| | | |
|---|---|---|
| CA | 2736083 A1 | 9/2012 |
| EP | 1916738 A1 | 4/2008 |

OTHER PUBLICATIONS

Stratus Lite Repeater, Jun. 2017, 2 pages, Issue 2, 12-20314-EN, Codan Radio Communications.

(Continued)

*Primary Examiner* — Hong S Cho

(57) ABSTRACT

Systems and methods are provided for configuring interface devices of a portable communication system. One interface device is configured as a primary device and the other interface devices are configured as secondary devices. The primary device can be used to facilitate communication between portable devices of the portable communication system and/or to facilitate communication between a portable device and a remote communication center. An interface device can receive priority factor information about an interface device operating as a primary device via a beacon signal. The received priority factor information is then compared to the interface device's own priority factor information to determine which interface device should be the primary device. The process of determining a primary device from two interface devices can be repeated, as needed, to have one interface device designated as the primary device and the remaining interface devices designated as secondary devices.

20 Claims, 4 Drawing Sheets

(56) References Cited

U.S. PATENT DOCUMENTS

| | | | |
|---|---|---|---|
| 5,533,097 A | 7/1996 | Crane et al. | |
| 5,590,022 A | 12/1996 | Harvey | |
| 5,594,394 A | 1/1997 | Sasaki | |
| 5,634,200 A | 5/1997 | Kitakubo | |
| 5,770,940 A | 6/1998 | Goder | |
| 5,781,563 A | 7/1998 | Schalamon | |
| 5,789,995 A | 8/1998 | Minasi | |
| 5,903,548 A | 5/1999 | Delamater | |
| 5,914,544 A | 6/1999 | Tanaka | |
| 6,134,105 A | 10/2000 | Lueker | |
| 6,198,288 B1 | 3/2001 | Gauss | |
| 6,496,083 B1 | 12/2002 | Kushitani | |
| 6,560,444 B1 | 5/2003 | Imberg | |
| 7,129,805 B2 | 10/2006 | Marion | |
| 7,391,283 B2 | 6/2008 | Kearns | |
| 8,428,573 B2 | 4/2013 | Martz et al. | |
| 8,583,065 B2 | 11/2013 | Ben-Bassat | |
| 8,593,358 B2 | 11/2013 | Rappaport | |
| 8,594,611 B2 | 11/2013 | Chauhan et al. | |
| 8,797,844 B1 * | 8/2014 | Strahle | H04L 45/28 370/219 |
| 8,937,816 B2 | 1/2015 | Trombino | |
| 9,026,041 B2 | 5/2015 | Forster | |
| 9,293,808 B1 | 3/2016 | Roberts et al. | |
| 10,115,510 B2 | 10/2018 | Keller | |
| 10,200,031 B2 | 5/2019 | Forstmaler | |
| 10,505,574 B2 | 12/2019 | Kolanski et al. | |
| 10,629,972 B2 | 4/2020 | Kuo | |
| 11,323,147 B1 | 5/2022 | Gostyuhev | |
| 2002/0100970 A1 | 8/2002 | Kitazawa | |
| 2002/0137471 A1 | 9/2002 | Satoh | |
| 2004/0032706 A1 | 2/2004 | Kemmochi | |
| 2004/0061578 A1 | 4/2004 | Vice | |
| 2004/0092285 A1 | 5/2004 | Kodim | |
| 2004/0127182 A1 | 7/2004 | Hayashi | |
| 2004/0157579 A1 | 8/2004 | Namura | |
| 2004/0242165 A1 | 12/2004 | Jedeloo | |
| 2004/0266378 A1 | 12/2004 | Fukamachi | |
| 2005/0035824 A1 | 2/2005 | Kearns | |
| 2005/0048927 A1 | 3/2005 | Kemmochi | |
| 2005/0077980 A1 | 4/2005 | Watanabe | |
| 2006/0017607 A1 | 1/2006 | Hayata | |
| 2006/0170516 A1 | 8/2006 | Marion | |
| 2006/0245382 A1 | 11/2006 | Hayashi | |
| 2007/0018753 A1 | 1/2007 | Poveda | |
| 2007/0026836 A1 | 2/2007 | Chow | |
| 2007/0232228 A1 | 10/2007 | McKay | |
| 2007/0241155 A1 | 10/2007 | Trajkovic et al. | |
| 2008/0181282 A1 | 7/2008 | Wala et al. | |
| 2009/0077608 A1 | 3/2009 | Romerein | |
| 2010/0289597 A1 | 11/2010 | Wolfe | |
| 2012/0068899 A1 | 3/2012 | Ayotte et al. | |
| 2014/0120968 A1 | 5/2014 | Mahmood | |
| 2014/0124908 A1 | 5/2014 | Sameshima | |
| 2014/0125545 A1 | 5/2014 | Forster | |
| 2016/0261267 A1 | 9/2016 | Liu | |
| 2016/0261514 A1 * | 9/2016 | Gopinathan | H04L 43/0888 |
| 2017/0040996 A1 | 2/2017 | Zhao | |
| 2017/0302269 A1 | 10/2017 | Forstmaier | |
| 2017/0345620 A1 | 11/2017 | Coumou | |
| 2018/0013425 A1 | 1/2018 | Foley | |
| 2019/0074857 A1 | 3/2019 | Kolanski et al. | |
| 2019/0110021 A1 | 4/2019 | Bailey | |
| 2020/0144032 A1 | 5/2020 | Ulrich | |
| 2020/0279844 A1 | 9/2020 | Brogle | |
| 2021/0135326 A1 | 5/2021 | Puente | |
| 2021/0152208 A1 | 5/2021 | Moreschi | |

OTHER PUBLICATIONS

Stratus Product White Paper P25 & LTE: The best of both worlds, 17 pages, Codan Radio Communications, May 2022.

* cited by examiner

SYSTEM AND METHOD FOR CONFIGURING A PORTABLE COMMUNICATION SYSTEM

BACKGROUND

The present application generally relates to systems and methods for configuring portable communication systems. More specifically, the present application is directed to determining a primary communication device from several communication devices in a portable communication system.

A portable communication system may be set up in a local area to facilitate communications in the area (e.g., among people in the area and/or between people in the area and people at a remote location). For example, fire or police personnel may establish a portable communication system at an incident site (or scene) to enable the personnel to communicate with each other at the site and/or to communicate with a central dispatch or command center. Each fire or police vehicle responding to an incident typically includes a digital vehicular repeater system (DVRS) that has been installed in the vehicle and operates at a preselected frequency. The DVRS can include a mobile radio and a repeater. The mobile radio can provide connectivity between the vehicle and the central dispatch or command center to permit communications and data transfers to occur between the driver of the vehicle and the central dispatch or command center. The repeater can be used with one or more portable radios (e.g., a radio that is carried on the person) to facilitate communications between portable radios and/or to operate as a coverage extender (or relay) that permits the portable radios at the site to communicate with the central dispatch or command center (via the mobile radio) when an individual portable radio may not be able to communicate directly with the central dispatch or command center.

Typically when an organization (e.g., a police department or fire department) utilizes many vehicles with an installed DVRS, the repeater in each of the DVRSs is programmed to a preselected frequency that is the same for all of the repeaters. However, when multiple vehicles arrive at an incident site, the use of the same preselected frequency by the repeaters of the different DVRSs incorporated in the vehicles can cause interference among the portable radios (and repeaters) that can impede communications. To protect against the interference caused by the operation of several DVRSs and to provide for an organized method for dealing with the conflict among DVRSs, one of the DVRSs can be selected as the "primary" system at the incident site and whose repeater is to be used for communications at the preselected frequency. In order to select the primary DVRS (and corresponding primary repeater) for communication, the repeaters of the DVRSs at the incident site can detect the presence of each other via in-band signaling (sometimes referred to as a beacon) and negotiate which repeater is to be the primary repeater amongst the co-located repeaters. The primary repeater performs the task of providing repeat and coverage extension functions at the incident site, while any other repeaters are considered "secondary" repeaters and continue to listen to communications between the mobile devices and the primary repeater and act as a backup to the primary repeater. For example, a secondary repeater can become a primary repeater if the current primary repeater changes channels (i.e., changes frequency), powers down, or moves away.

While the designation of a primary repeater at an incident site is important, the current process for determining the primary repeater is mostly indeterminate resulting in an inability to predict which repeater is going to be selected as the primary repeater. One way to address the indeterminate selection of the primary repeater was to have a user designate a repeater in a DVRS as a "permanent primary repeater," which results in that repeater having a higher priority for being designated as the primary repeater over any repeater without the "permanent primary" designation. One example of a repeater that may be designated as a permanent primary repeater is the repeater incorporated in a mobile command center, which can have a better coverage installation (e.g., better/higher antenna and/or higher power) than typical DVRSs.

The current indeterminate process for determining the primary repeater can result in a few problematic situations. One situation is where an active primary repeater (with no associated portable radios) travels through an incident scene that already has an established primary repeater. In this situation, the repeaters detect each other via beacon signals and cooperatively choose one of them to be the primary repeater with the other repeater reverting to being a secondary repeater. If the transitory repeater is just passing through the area and gets selected as the primary repeater, there can be a disruption of communications as the on-scene portable radios switch from the previous primary repeater to the newly designated primary repeater (and then back again as the transitory repeater leaves the incident scene). For example, if a vehicle with an active repeater leaves an incident scene and fails/forgets to turn off its repeater, the travelling vehicle may inadvertently drive through the coverage area of another repeater and cause the conflict described above.

Another problematic situation occurs when one active primary repeater (with a set of associated portable radios) may come into the vicinity of another active primary repeater (having its own set of associated portable radios) due to the movement of the vehicular based DVRSs. In this case, a negotiation ensues to determine which one of the repeaters remains the primary repeater and which one reverts to a secondary repeater. Once this selection occurs, all of the portable radios can converge on the newly selected primary repeater, which can cause a brief disruption of communications especially if the selected primary repeater has fewer associated portable radios. For example, if there are two incident scenes that are geographically near each other, the repeaters may be initially out of range of each other, but if one or both of the repeaters move, then they can interact causing the conflict described above. Thus, what is needed is a way for the selection of a primary DVRS and corresponding primary repeater to be more determinate and predictable.

SUMMARY

The present application is directed to systems and methods for configuring primary and secondary mobile systems and more particularly, primary and secondary interface devices (e.g., repeaters) in a portable communication system. The portable communication system can include multiple mobile systems (e.g., digital vehicular repeater systems (DVRSs)) at an incident site. Each mobile system may be installed in a vehicle that can travel to the incident site and can include an interface device (e.g., a repeater) and a mobile communication device (e.g., a mobile radio). As the mobile systems arrive at the site, a determination is made as to which mobile system, specifically which interface device of a mobile system, can serve as the primary system for facilitating communications among portable communication devices (e.g., portable radios) at the incident site and for facilitating communications between the portable communication devices and a remote command center or central dispatch. The mobile systems that are not selected to be the primary system can be designated as secondary systems (with corresponding secondary interface devices) that may become the primary system if conditions at the incident site change.

To determine the primary system for communications, the mobile systems (specifically the interface devices) can communicate with each other via beacon signals to determine the primary system (and primary interface device). A system can receive information about the configuration of another system to determine which system is to be the primary system and which system is to be the secondary system. This process can be repeated among the mobile systems until only one system is the primary system and the remaining systems are secondary systems. As other mobile systems approach the incident site or the primary system leaves the incident site (or is otherwise unable to operate as the primary system), the process for determining the primary system can be repeated such that only one mobile system is designated as the primary system.

A mobile system can be designated as a primary system over another mobile system based on which mobile system has a higher priority. The determination of the mobile system with the higher priority is based on a comparison of several priority factors. The priority factors of the mobile systems are evaluated to determine if one system has a higher priority than the other system. If the systems have the same priority designations, then the systems can select one to be the primary system according to conventional techniques. The priority factors can be arranged in an order of preference (or precedence) such that the priority factors are evaluated in a predetermined order and once there is a difference between priority factors, the evaluation ends and a system is selected as having a higher priority. However, in other embodiments, the priority factors may be used to generate a "score" for each mobile system that is then evaluated to determine the primary system. When determining the score for a mobile system, the priority factors may or may not have an equal weight. In an embodiment, the priority factors can include whether or not the mobile system has a "permanent primary" designation, whether or not the mobile system is moving or stationary and how many portable communication devices (or subscribers) are connected to the interface device of the mobile system. For example, a mobile system with a permanent primary designation can be designated as the primary system over a mobile system without a permanent primary designation. In addition, if neither mobile system is designated as a permanent primary system, then a mobile system that is stationary can be designated as the primary system over a mobile system that is moving. Further, if neither mobile system is designated as a permanent primary system and both mobile systems are stationary, then a mobile system that has more connected portable communication devices (or subscribers) can be designated as the primary system over a mobile system that has fewer connected portable communication devices.

One advantage of the present application is that a user can select the priority factors used to determine the primary system and the order or preference of the priority factors used to determine the primary system.

Another advantage of the present application is that the information regarding the priority factors can be communicated using the existing beacon signal communicated among the interface devices of the mobile systems.

Other features and advantages of the present application will be apparent from the following more detailed description of the identified embodiments, taken in conjunction with the accompanying drawings which show, by way of example, the principles of the application.

BRIEF DESCRIPTION OF THE DRAWINGS

Wherever possible, the same reference numbers are used throughout the drawings to refer to the same or like parts.

DETAILED DESCRIPTION

Figure 1:
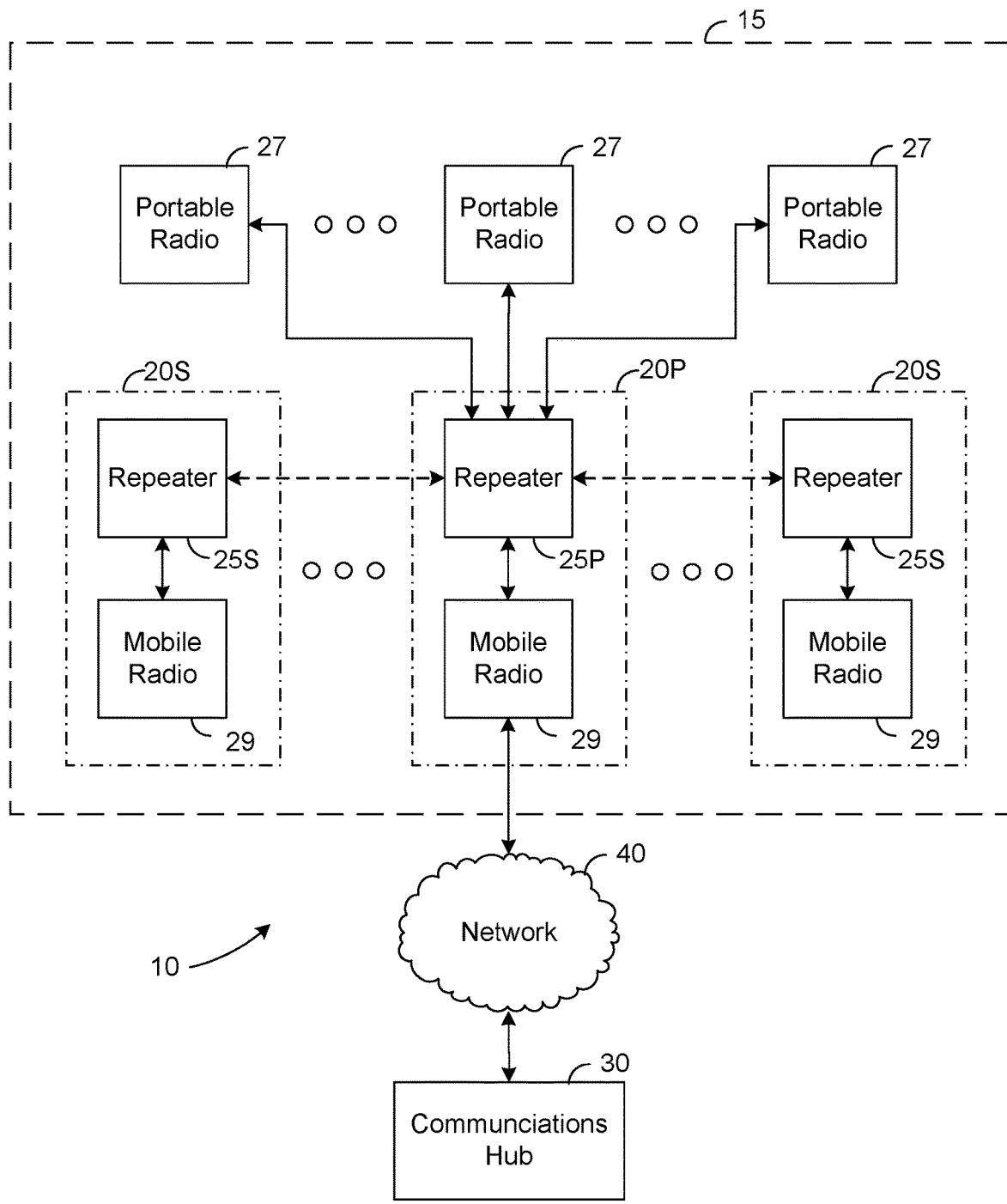
FIG. 1 is a block diagram showing an embodiment of a communication network.

FIG. 1 shows an embodiment of a communication network 10. The network 10 can include a local network 15 in communication with a communications hub 30 via a network 40. In one embodiment, the network 40 can incorporate one or more radio towers (each having corresponding transmitters and receivers) that operate as intermediaries to facilitate communications between the communication devices of the local network 15 and the communications hub 30. The radio tower can communicate with the communication devices of the local network 15 via a wireless connection. In addition, the radio tower may have a wired and/or wireless connection with the communications hub 30.

The local network 15 can incorporate communication equipment from several mobile systems 20 that are located at a site or scene. In addition, the local network 15 can include one or more portable communication devices (or portable radios) 27 that are carried by individuals at the site or scene. Each mobile system 20 can include a mobile communication device (or mobile radio) 29 and an interface device (or repeater) 25. While not explicitly shown in FIG. 1, each portable radio 27 (when in range) and each mobile radio 29 is able to communicate with the communications hub 30 via the network 40 (and corresponding radio towers). In one embodiment, the mobile system 20 can be a digital vehicular repeater system (DVRS) incorporated or installed into a vehicle. However, in other embodiments, the mobile system 20 can be a portable communication system as described in more detail in U.S. Pat. No. 10,361,737, which is incorporated herein by reference.

In an embodiment, the mobile systems 20 that form the local network 15 can be from the same organization and can have an identical configuration. For example, the mobile radio 29 and repeater 25 for each mobile system 20 in the local network 15 can communicate via the same preselected frequency that has been selected by the organization. While the use of the same preselected frequency by each mobile system 20 is not problematic when the mobile systems 20 are used outside of the local network 15, the use of the same frequency by the mobile systems 20 within the local network 15 can cause interference that can impact communications between the portable radios 27. Thus, as will be described in greater detail below, one mobile system 20 can be designated as the primary system 20P and the remaining mobile systems can be designated as secondary systems 20S. More specifically, the primary system 20P can have a primary repeater 25P and the secondary systems 20S can have secondary repeaters 25S.

As shown in FIG. 1, the primary repeater 25P can communicate with portable radios 27 using the preselected frequency for the mobile systems 20. In one embodiment, the primary repeater 25P can communicate with portable radios 27 using any suitable RF or microwave channel, band or frequency such as a HF (high frequency) band (e.g., 3-30 MHZ), a VHF (very high frequency) band (e.g., 30-300 MHz including 136 MHz to 174 MHZ), a UHF (ultra high frequency) band (e.g., 300-3,000 MHZ including 380 MHz to 430 MHz, 450 MHz to 470 MHz, 470 MHz to 512 MHz, 764 MHz to 776 MHz, 794 MHz to 806 MHz, 806 MHz to 824 MHz or 851 MHz to 869 MHZ) or a SHF (super high frequency) band (e.g., 3-30 GHZ). In another embodiment, the primary repeater 25P and the portable radios 27 can use infrared communications.

In some embodiments, the transmissions between the primary repeater 25P and the portable radios 27 can use the Project 25 (P25) Common Air Interface (CAI) standard that specifies the type and content of signals transmitted by the portable radios 27 for digital radio communications. The P25 standard can be used by public services personnel to communicate with each other during emergency situations and in the course of performing their duties. However, in other embodiments, the communications between the portable radios 27 and the primary repeater 25P can use other suitable standards or communication protocols. In a further embodiment, the portable radios 27 can be 2-way radios configured to communicate with the primary repeater 25P. However, in other embodiments, the portable radios 27 can be any device capable of RF (or microwave) communications such as smartphones, tablet computers and laptop computers. In an embodiment, the mobile device 29 of the primary mobile system 20P can be connected to the network 40 (and the communications hub 30) using an appropriate wireless interface.

The communications hub 30 can be located at a remote location from the local network 15 and can include a system infrastructure such that fixed-end equipment (e.g., data interfaces such as conventional channel gateway (CCGW) or digital unit interface (DIU), consoles, voting/comparator systems, etc.) and data/software applications (e.g., dispatch applications, location services applications, safety applications, security applications, etc.) at the communication hub 30 can have access to and communicate with the local network 15 and the portable radios 27. In one embodiment, the communications hub 30 can use a digital communication system such as ASTRO® 25 by Motorola Solutions.

Figure 2:
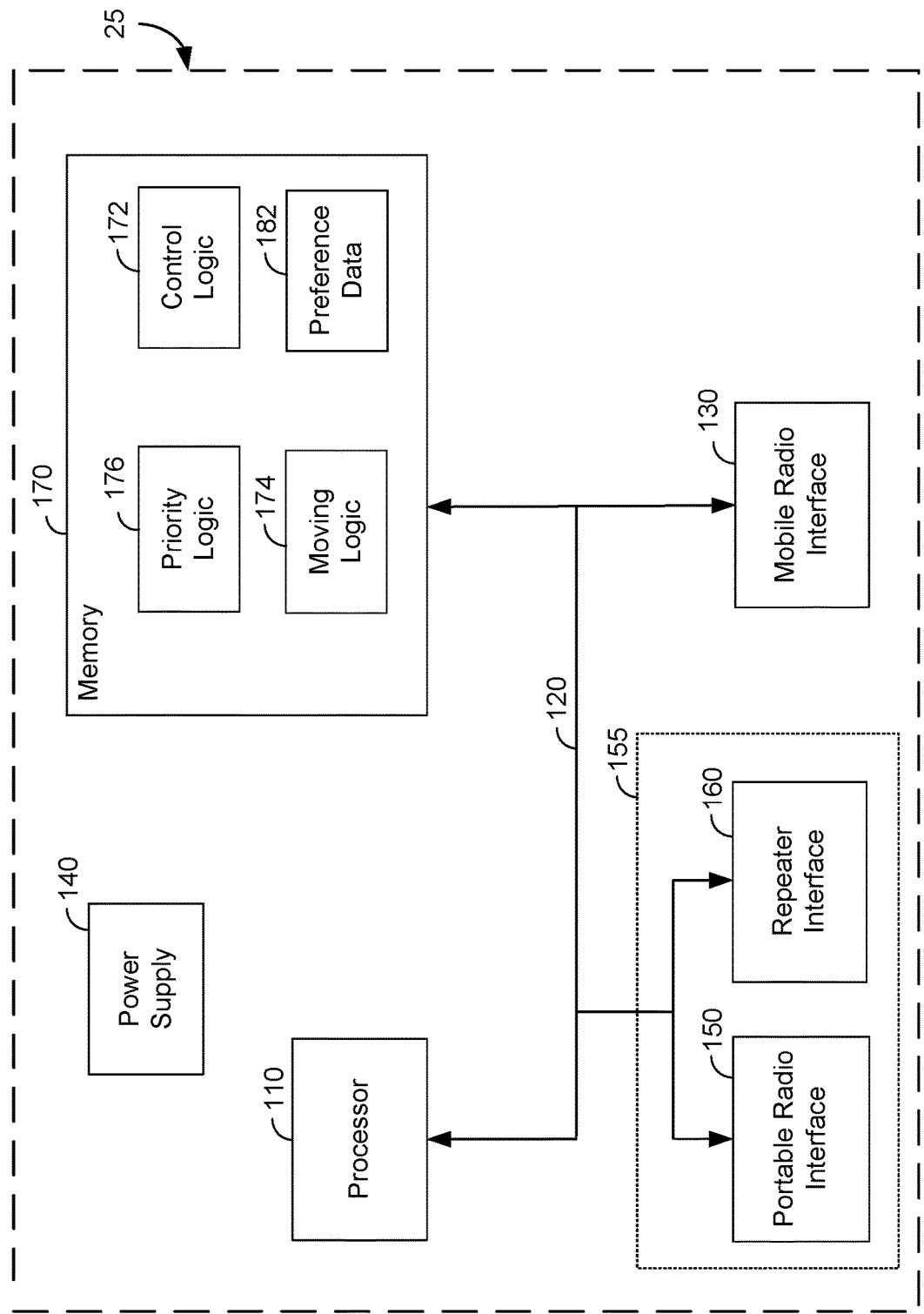
FIG. 2 is a block diagram showing an embodiment of a repeater from the communication network of FIG. 1.

FIG. 2 shows an embodiment of a repeater (or interface device) 25 from a mobile system 20. The repeater 25 shown by FIG. 2 can include logic 172, referred to herein as "control logic," for generally controlling the operation of the repeater 25, and in some embodiments, the operation of the mobile system 20. The repeater 25 also includes logic 174, referred to herein as "moving logic," and logic 176, referred to herein as "priority logic." The moving logic 174 can be used for determining whether the mobile system 20 is stationary or in motion. The priority logic 176 can be used to determine whether the repeater 25 (of the mobile system 20) is to be designated as the primary repeater 25P or a secondary repeater 25S when several mobile systems 20 are located at a site or scene. In other embodiments, the moving logic 174 and/or the priority logic 176 can be combined with the control logic 172 or with one another. The control logic 172, the moving logic 174 and the priority logic 176 may be implemented in software, firmware, hardware, or any combination thereof. In FIG. 2, control logic 172, the moving logic 174 and the priority logic 176 are implemented in software and stored in memory 170. However, other configurations of the control logic 172, the moving logic 174 and the priority logic 176 are possible in other embodiments.

Note that the control logic 172, the moving logic 174 and the priority logic 176, when implemented in software, can be stored and transported on any computer-readable medium for use by or in connection with an instruction execution apparatus that can fetch and execute instructions. In the context of this document, a "computer-readable medium" can be any non-transitory means that can contain or store code for use by or in connection with the instruction execution apparatus.

The repeater 25 may include at least one conventional processor 110, which includes processing hardware for executing instructions stored in the memory 170. As an example, the processor 110 may include a central processing unit (CPU) or a digital signal processor (DSP). The processor 110 communicates to and drives the other elements within the repeater 25 via a local interface 120, which can include at least one bus. When the control logic 172, the moving logic 174 and the priority logic 176 are implemented in software, the processor 110 may execute instructions of the control logic 172, the moving logic 174 and the priority logic 176 to perform the functions ascribed herein to the control logic 172, the moving logic 174 and the priority logic 176.

The repeater 25 can have a mobile radio interface 130 for connecting the repeater 25 to the mobile radio 29 (for communication over the network 40). The mobile radio interface 130 may include a radio or other device for communicating wirelessly with the mobile radio 29 and/or corresponding connection ports for wired communications between the repeater 25 and the mobile radio 29. The repeater 25 can also have a power supply 140, which provides electrical power to the components of the repeater 25. In one embodiment, the power supply 140 has an interface that allows it to plug into or otherwise interface with an external component, such as a battery of the vehicle housing the mobile system 20, and receive electrical power from the external component. If desired, the power supply 140 may incorporate one or more batteries to permit the repeater 25 to be independent of the external power component.

The repeater 25 can include a communication interface 155 that has a portable radio interface 150 and a repeater interface 160. In one embodiment, the portable radio interface 150 and the repeater interface 160 may be individually used as separate interfaces. The portable radio interface 150 enables the repeater 25 to exchange (e.g., send and receive) signals and data with the portable radios 27 of the local network 15. The repeater interface 160 enables the repeater 25 to provide a beacon (or in-band) signal for communication with other repeaters 25 located in the local network 15. Each of the portable radio interface 150 and the repeater interface 160, whether incorporated as part of the communication interface 155 or used individually, may include any suitable interfaces for providing signals and/or data between the processor 110 and the corresponding components (e.g., transceivers and/or antennas) of the interface.

In addition, the repeater 25 can store preference data 182 in memory 170 that can be used by the priority logic 176 to determine (when multiple mobile systems 20 are in a local network 15) whether the repeater 25 is to be designated as a primary repeater 25P or is to be designated as a secondary repeater 25S. In an embodiment, the preference data 182 for each of the repeaters 25 of an organization can include the same priority factors (i.e., each repeater 25 can have an identical configuration of priority factors) even if the information associated with a particular priority factor may be different. By having the same (or nearly the same) priority factors in preference data 182, two repeaters are able to reach the same determination about which repeater 25 is to be designated as the primary repeater 25P and which repeater 25 is to be designated as the secondary repeater 25S.

The preference data 182 can store information regarding a number of different priority factors (or configuration parameters) that can be evaluated by the priority logic 176 to make a determination regarding a primary/secondary designation for the repeater 25. In addition, the preference data 182 can store user-defined information regarding an order of preference (or priority) for the priority factors or parameters and/or corresponding weights to be assigned to the priority factors or parameters that can be used by the priority logic 176 to make the primary/secondary designation determination. In one embodiment, the priority factors or parameters can include a permanent primary designation preference, a stationary repeater preference and a number of "subscribers" or connected portable radios 27 preference. In other embodiments, additional priority factors or parameters may be added to the preference data 182 (e.g., a power level of the mobile radio 29 for the mobile system 20) and/or one or more of the priority factors or parameters described above may be removed from the preference data 182.

The permanent primary designation preference (e.g., a yes or no indication in preference data 182) can indicate whether a particular repeater 25 is intended to be used as the primary repeater 25P (e.g., a repeater 25 associated with a mobile command center) and is to be given preference over other repeaters 25 that do not include a permanent primary designation. The permanent primary designation preference can be configured permanently in the preference data 182 (via a repeater configuration tool) or can be updated (or modified) in real-time by a user for each individual repeater 25.

The stationary repeater preference (e.g., a none or stationary indication in preference data 182) can indicate whether an active repeater 25 that is stationary (i.e., not moving) is favored over a repeater 25 that is determined to be moving (or in motion) when selecting the primary repeater 25P. In one embodiment, a "stationary" indication indicates that the repeater 25 that is stationary is favored over a repeater 25 that is in motion during the selection of the primary repeater 25P and a "none" indication indicates that no preference is given to whether a repeater is in motion or stationary during the selection of the primary repeater 25P. The determination of whether the repeater 25 is stationary or in motion is made by the moving logic 174. The moving logic 174 may use a variety of different techniques to determine whether the repeater 25 is stationary or in motion. In one embodiment, the moving logic 174 may use GPS detection and/or information from the vehicle (e.g., whether the vehicle is in "Park" or "Drive") to determine if the vehicle (and the corresponding repeater 25) is stationary or in motion.

The number of connected portable radios (or subscribers) preference (e.g., a yes or no indication in preference data 182) can indicate whether an active repeater 25 having a greater number of associated portable radios 27 is favored over another active repeater 25 having a smaller number of associated portable radios 27 when selecting the primary repeater 25P. In one embodiment, a "yes" indication indicates that the repeater 25 with the greater number of associated (or connected) portable radios 27 is favored during the selection of the primary repeater 25P and a "no" indication indicates that the number of associated (or connected) portable radios 27 associated with a repeater 25 does not affect or impact the selection of the primary repeater 25P.

The preference data 182 can also include information regarding an order of priority (or preference) for the priority factors or parameters. The order of priority information permits the priority logic 176 to evaluate the information associated with the priority factors or parameters stored in the preference data 182 to determine whether the repeater 25 is to be designated as the primary repeater 25P. In one embodiment, the order of priority can be 1) the permanent primary designation preference, 2) the stationary repeater preference, and 3) the number of subscribers preference. In other embodiments, the order of priority may be changed to indicate different parameters having more importance or less importance in the determination of a primary repeater 25P. In still another embodiment, instead of using an order of priority to determine a primary repeater 25P, a scoring system can be used by the priority logic 176 to determine the primary repeater 25P. The priority logic 176 can evaluate each of the priority factors or parameters in the preference data 182 for the repeater 25 to generate a score and the repeater (amongst two repeaters) with the highest (or lowest) score can be designated as the primary repeater 25P. In an embodiment, the priority factors or parameters may be weighted differently by the priority logic 176 when determining the score for a repeater 25 such that certain priority factors or parameters affect the score of a repeater 25 more than other priority factors or parameters. For example, the permanent primary designation preference may be weighted twice as much as the stationary repeater preference and the number of subscribers preference. In other words, the permanent primary designation preference may account for 50% of a repeater's score while the stationary repeater preference and the number of subscribers preference may each account for only 25% of the repeater's score.

In an embodiment, when the repeater 25 of a mobile system 20 is activated at a site or scene, the repeater 25 begins listening for a beacon signal from a primary repeater 25P. If another repeater 25 is at the site and operating as a primary repeater 25P, the newly-activated repeater 25 proceeds to determine whether the newly-activated repeater 25 is to take over operation as the primary repeater 25P or whether the newly-activated repeater 25 is to become a secondary repeater 25S and permit the current primary repeater 25P to remain as the primary repeater 25P. If the newly-activated repeater 25 does not detect a beacon signal after a predetermined time period has elapsed, the newly activated repeater 25 starts operating as a the primary repeater 25P. As additional mobile systems 20 and repeaters 25 arrive at the site or scene, the process for determining the primary repeater 25P is repeated between the current primary repeater 25P at the site and the newly arrived repeater 25. The secondary repeaters 25S at the site, remain as secondary repeaters 25S and do not participate in the determination of the primary repeater 25P as long as the primary repeater 25P is providing a beacon signal. If the primary repeater 25P is deactivated, changes operating frequency or leaves the site (i.e., is no longer transmitting a beacon signal that is detectable by the secondary repeaters 25S), then the secondary repeaters 25S can rejoin the process for determining a new primary repeater 25P.

Figure 3:
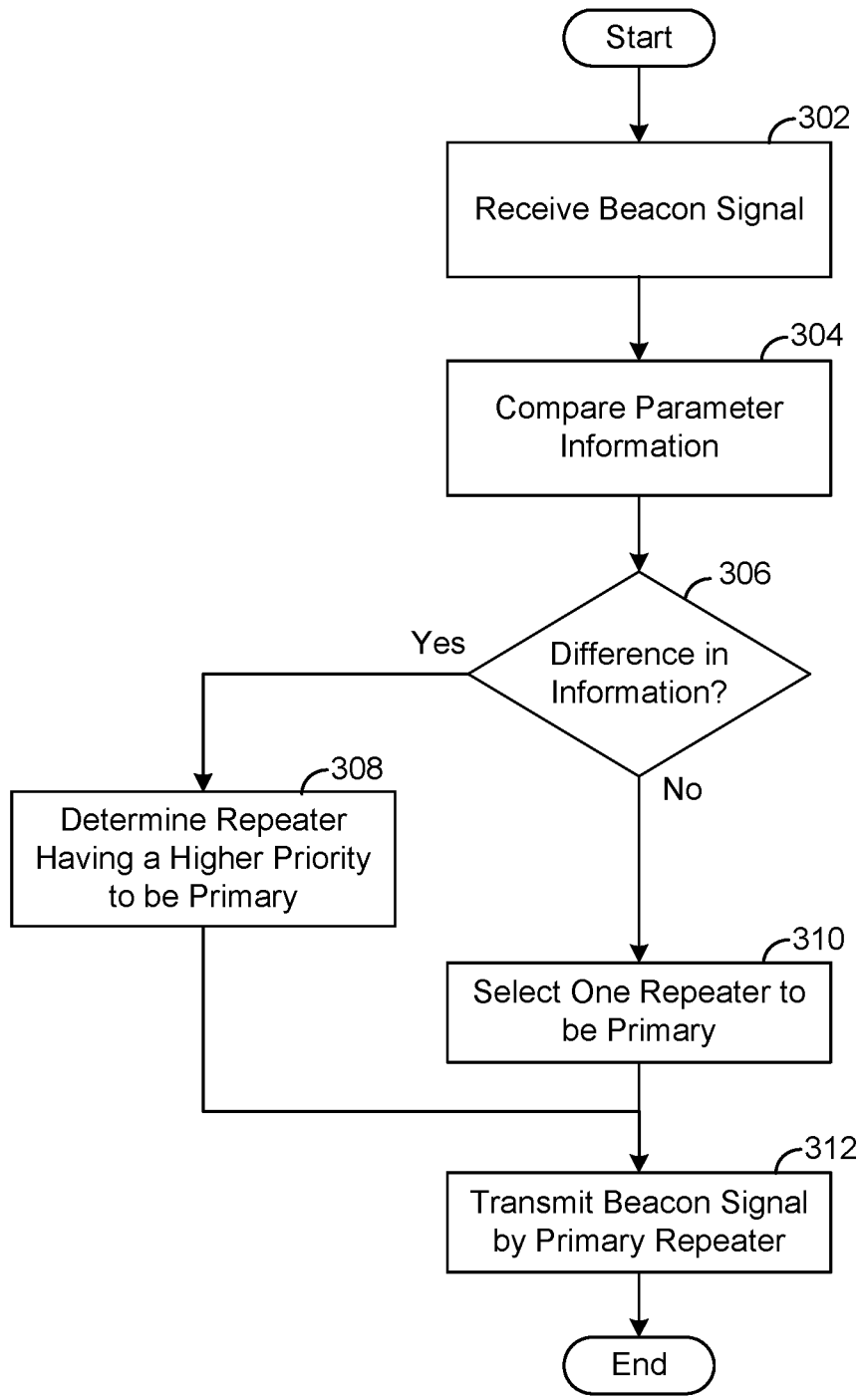
FIG. 3 is a flowchart showing an embodiment of a process for determining a primary repeater.
Figure 4:
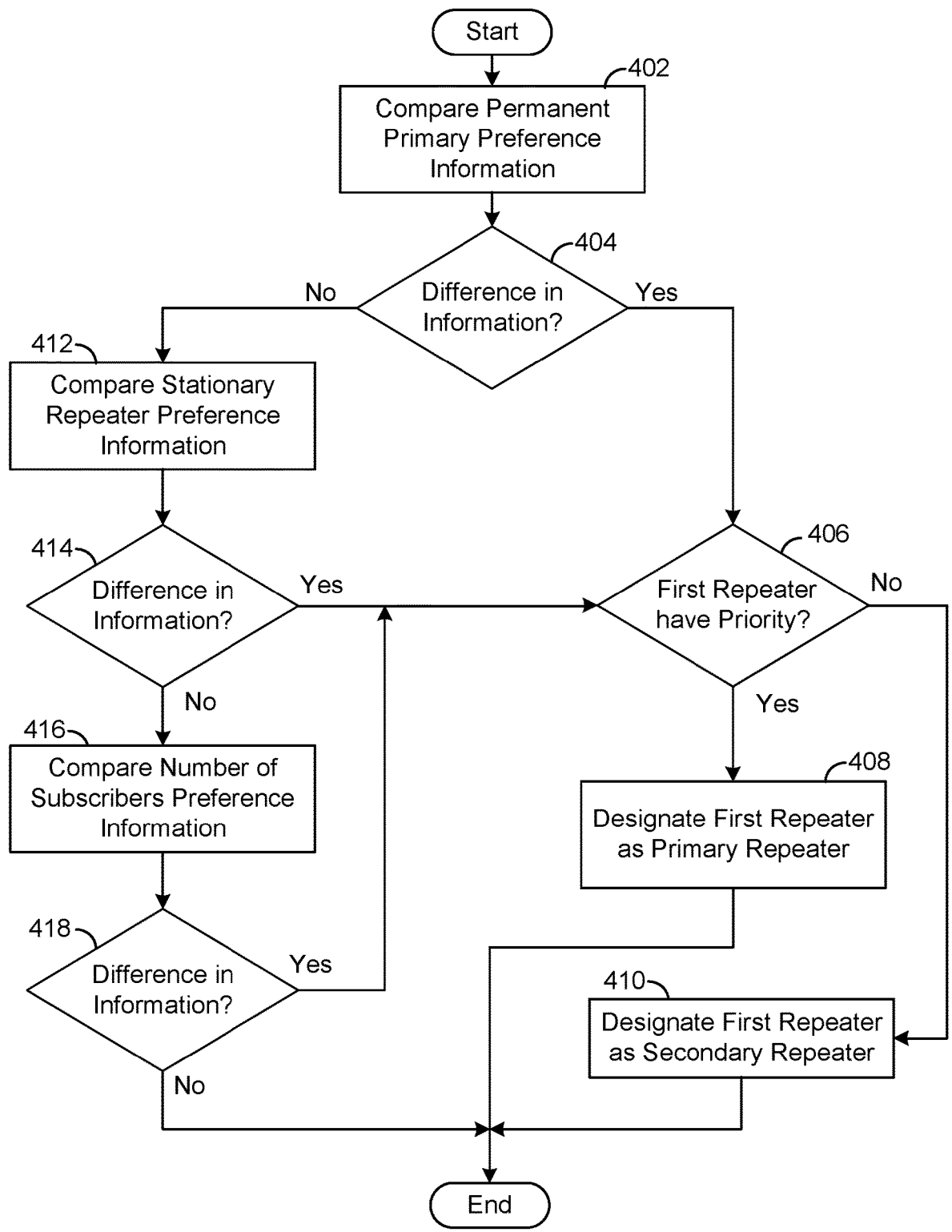
FIG. 4 is a flowchart showing an embodiment of a process for determining a repeater with a higher priority level among two repeaters.

FIGS. 3 and 4 show flow charts for determining a primary repeater 25P between two repeaters 25 at a site. FIG. 3 shows an embodiment of a process implemented individually by a repeater 25 to determine which repeater (of the two repeaters) is to be the primary repeater 25P. FIG. 4 shows an embodiment of a process for determining if one repeater 25 has a higher priority than another repeater 25.

FIG. 3 is directed to an embodiment of a process for determining which repeater 25, among two repeaters 25 at a site, is to be designated as the primary repeater 25P. The process begins with the repeater interface 160 of a repeater receiving the beacon signal from a primary repeater 25P (step 302). The priority logic 176 of the repeater can extract priority factor information about the primary repeater 25P from the received beacon signal. In one embodiment, the beacon signal from the primary repeater 25P can include only priority factor information that is used by the priority logic 176 to determine which repeater is going to be the primary repeater 25P. However, in other embodiments, the beacon signal can include additional priority factor information about the repeater from preference data 182, even if the priority factor information is not needed by the priority logic 176 when determining a primary repeater 25P.

The priority logic 176 of the repeater can then compare the priority factor information about the primary repeater 25P to its own stored priority factor information in preference data 182 (step 304). After comparing the priority factor information from the primary repeater 25P to its own priority factor information, the priority logic 176 then determines whether there is a difference between the priority factor information (step 306). If there is a difference between the priority factor information, the priority logic 176 determines which repeater has the higher priority and is to be designated as the primary repeater (step 308). In one embodiment, the determination of whether there is a difference in priority factor information and the determination of the repeater having the higher priority to be designated as the primary repeater performed in steps 306 and 308 can be the process shown in FIG. 4. However, other processes for determining a difference in priority factor information and determining a primary repeater based on which repeater has a higher priority can be used in other embodiments. If the priority logic 176 determines that there is no difference between the priority factors, then the repeaters begin a conventional negotiation process to select one of the repeaters to be the primary repeater (step 310). After the primary repeater 25P is determined from step 308 or selected from step 310, the "chosen" primary repeater 25P begins (or continues) transmitting a beacon signal (step 312) with the priority factor information for the repeater and the process ends.

FIG. 4 is directed to an embodiment of a process for determining differences in priority factor information and, if there are differences in priority factor information, which repeater, of two different repeaters (i.e., a first repeater and a second repeater), has a higher priority (based on the priority factor information) and is to be designated as the primary repeater. The process begins by comparing the permanent primary preference information for each of the repeaters (step 402). A determination is then made as to whether there is a difference between the permanent primary preference information (step 404) between the repeaters (i.e., one repeater has a permanent primary designation while the other repeater does not have such a designation). If there is a difference between the permanent primary preference information, then a determination is made as to whether the repeater performing the analysis (i.e., the first repeater) includes the permanent primary designation and has priority (step 406) or if the other repeater (i.e., the second repeater) has priority. If the repeater performing the analysis (i.e., the first repeater) has priority, then the (first) repeater begins (or continues) transmitting the beacon signal, sets an internal designation to make the (first) repeater a primary repeater (step 408) and the process ends. If the repeater performing the analysis (i.e., the first repeater) determines that the other repeater (i.e., the second repeater) has priority, then the (first) repeater stops transmitting the beacon signal (if previously transmitting a beacon signal) or does not start transmitting a beacon signal, sets an internal designation to make the (first) repeater a secondary repeater (step 410) and the process ends.

If there is no difference between the permanent primary preference information, then a comparison is made of the stationary repeater preference information (step 412) for the repeaters. A determination is then made as to whether there is a difference between the stationary repeater preference information (step 414) between the repeaters (i.e., one repeater is stationary or not moving while the other repeater is moving). If there is a difference between the stationary repeater preference information, then a determination is made as to whether the repeater performing the analysis (i.e., the first repeater) is stationary and has priority (step 406) or if the other repeater (i.e., the second repeater) is stationary and has priority. If the repeater performing the analysis (i.e., the first repeater) has priority, then the (first) repeater starts or continues to transmit a beacon signal and is designated as the primary repeater (step 408), as described above, and the process ends. If the repeater performing the analysis (i.e., the first repeater) determines that the other repeater (i.e., the second repeater) has priority, then the (first) repeater stops transmitting or does not transmit a beacon signal and is designated as the secondary repeater (step 410), as described above, and the process ends.

If there is no difference between the stationary repeater preference information, then a comparison is made of the number of subscribers preference information (step 416) for the repeaters. A determination is then made as to whether there is a difference in the number of subscribers preference information (step 418) between the repeaters (e.g., one repeater has 10 subscribers (or connected portable devices) while the other repeater has 3 subscribers (or connected portable devices)). If there is a difference between the number of subscribers preference information, then a determination is made as to whether the repeater performing the analysis (i.e., the first repeater) has the most subscribers and has priority (step 406) or if the other repeater (i.e., the second repeater) has the most subscribers and has priority. If the repeater performing the analysis (i.e., the first repeater) has priority, then the (first) repeater starts or continues to transmit a beacon signal and is designated as the primary repeater (step 408), as described above, and the process ends. If the repeater performing the analysis (i.e., the first repeater) determines that the other repeater (i.e., the second repeater) has priority, then the (first) repeater stops transmitting or does not transmit a beacon signal and is designated as the secondary repeater (step 410), as described above, and the process ends. If there is no difference between the number of subscribers preference information, then a determination is made that there is no difference in priority factor information between the repeaters (i.e., a "NO" determination in step 306) and the process of FIG. 4 ends.

In an embodiment, the processes of FIGS. 3 and 4 can be repeated several times among pairs of repeaters until only one repeater 25 at a site has the primary repeater designation. The number of times the processes of FIGS. 3 and 4 are used can depend on the number of repeaters 25 at the site. The processes of FIGS. 3 and 4 operate between two repeaters 25 to designate one of the repeaters 25 to be a primary repeater and to designate the other one of the repeaters 25 to be a secondary repeater with the result that that only one repeater 25 at the site has a primary repeater designation. For example, the primary repeater 25P at the site transmits a beacon signal until the primary repeater 25P receives a beacon signal from a newly-activated repeater 25 having a primary repeater designation, which primary repeater designation resulted from the newly-activated repeater performing the processes of FIGS. 3 and 4 and determining that the newly-activated repeater is to be the primary repeater. Once the "new" beacon signal is received by the "current" primary repeater 25P, the "current" primary repeater 25P performs the processes of FIGS. 3 and 4, determines that the newly-activated repeater is to be the primary repeater 25P (since both repeaters perform the same process with the same information), and changes its designation to secondary repeater 25S and stops transmitting a beacon signal. In addition, if the primary repeater 25P leaves the site, changes operating frequency or is deactivated, the secondary repeaters 25S will stop receiving the beacon signal from the primary repeater 25P. When the secondary repeaters 25S stop receiving the beacon signal from the primary repeater 25P, one of the secondary repeaters 25S (e.g., the first secondary repeater 25S to determine that the primary repeater 25P has stopped transmitting a beacon signal) can begin operating as the primary repeater 25P and send a beacon signal to the other secondary repeaters 25S. As the other secondary repeaters 25S receive the beacon signal from the "new" primary repeater 25P, the other secondary repeaters 25S perform the processes of FIGS. 3 and 4 to determine whether the "new" primary repeater 25P is to remain as the primary repeater or whether the secondary repeater 25S has priority and is to take over as the primary repeater 25P by transmitting a beacon signal. This process can be repeated until a single primary repeater 25P is determined from the secondary repeaters 25S.

Although the figures herein may show a specific order of method steps, the order of the steps may differ from what is depicted. Also, two or more steps may be performed concurrently or with partial concurrence. Variations in step performance can depend on the software and hardware systems chosen and on designer choice. All such variations are within the scope of the application. Software implementations could be accomplished with standard programming techniques, with rule based logic and other logic to accomplish the various connection steps, processing steps, comparison steps and decision steps.

It should be understood that the identified embodiments are offered by way of example only. Other substitutions, modifications, changes and omissions may be made in the design, operating conditions and arrangement of the embodiments without departing from the scope of the present application. Accordingly, the present application is not limited to a particular embodiment, but extends to various modifications that nevertheless fall within the scope of the application. It should also be understood that the phraseology and terminology employed herein is for the purpose of description only and should not be regarded as limiting.

What is claimed is:

1. An interface device for a portable communication system comprising:
   a processor;
   an interface configured to transmit a first beacon signal and to receive a second beacon signal from an additional interface device of the portable communication system;
   a memory device storing first preference data associated with the interface device and priority logic configured to determine whether the interface device is designated a primary interface device or a secondary interface device, wherein the first preference data includes at least one of information regarding whether the interface device is in motion or information regarding a number of subscribers connected to the interface device; and
   the priority logic comprising instructions that, when executed by the processor, cause the processor to:
      receive, via the interface, the second beacon signal from the additional interface device;
      extract second preference data associated with the additional interface device;
      compare the extracted second preference data to the stored first preference data; and
      designate the interface device as one of a primary interface device or a secondary interface device based on the comparing.

2. The interface device of claim 1, wherein the first preference data further includes information regarding a permanent primary designation.

3. The interface device of claim 2, wherein the priority logic further comprises instructions that, when executed by the processor, cause the processor to determine whether the interface device or the additional interface device has a higher priority based on the comparing.

4. The interface device of claim 3, wherein the priority logic further comprises instructions that, when executed by the processor, cause the processor to evaluate the extracted second preference data and the stored first preference data in a preselected order to determine whether the interface device or the additional interface device has a higher priority.

5. The interface device of claim 4, wherein the priority logic further comprises instructions that, when executed by the processor, cause the processor to determine whether the interface device or the additional interface device has a higher priority based on a difference in the evaluation of the extracted second preference data and the stored first preference data.

6. The interface device of claim 2, wherein the instructions that when executed by the processor cause the processor to perform operations further comprise:
   calculate a first score based on the first preference data;
   calculate a second score based on the second preference data;
   compare the first score and the second score; and
   designate the interface device as one of a primary interface device or a secondary interface device based on the comparison.

7. The interface device of claim 1, wherein the interface is further configured to communicate with one or more portable communication devices of the portable communication system.

8. A method for determining a primary interface device in a portable communication network, the method comprising:
   storing, at a first interface device, first preference information associated with the first interface device, the first preference information including at least one of a stationary interface device priority factor or a number of subscribers priority factor;
   receiving, at the first interface device, a beacon signal from a second interface device;

extracting, by the first interface device, second preference information from the received beacon signal, wherein the second preference information is associated with the second interface device and includes the at least one of the stationary interface device priority factor or the number of subscribers priority factor;

comparing the extracted second preference information to the stored first preference information; and designating the first interface device as one of a primary interface device or a secondary interface device based on the comparing.

9. The method of claim 8, wherein comparing the extracted second preference information to the stored first preference information includes evaluating the priority factors from the first preference information and the second preference information in a preselected order.

10. The method of claim 9, wherein evaluating the priority factors includes evaluating the stationary interface device priority factor before the number of subscribers priority factor.

11. The method of claim 10, wherein evaluating the stationary interface device priority factor includes determining whether a difference is present between the stationary interface device priority factors of the first preference information and the second preference information, wherein a difference is present between the stationary interface device priority factors upon one of the first interface device and the second interface device being stationary and the other of the first interface device and the second interface device being in motion.

12. The method of claim 11, wherein evaluating the number of subscribers priority factor includes determining whether a difference is present between the number of subscribers priority factors of the first preference information and the second preference information, wherein a difference is present between the number of subscribers priority factors upon one of the first interface device and the second interface device having more connected subscribers than the other of the first interface device and the second interface device.

13. The method of claim 10, wherein the first preference information includes a permanent primary designation priority factor, and evaluating the priority factors includes evaluating the permanent primary designation priority factor.

14. The method of claim 13, wherein evaluating the permanent primary designation priority factor includes determining whether a difference is present between the permanent primary designation priority factors of the first preference information and the second preference information, wherein a difference is present between the permanent primary designation priority factors upon one of the first interface device and the second interface device has a permanent primary designation and the other of the first interface device and the second interface device lacks a permanent primary designation.

15. The method of claim 14, wherein evaluating the permanent primary designation priority factor occurs prior to evaluating the stationary interface device priority factor.

16. The method of claim 8, wherein comparing the extracted second preference information to the stored first preference information includes:

calculating a first score based on the first preference information and a second score based on the second preference information; and comparing the first score and the second score.

17. The method of claim 16, wherein calculating the first score and the second score includes calculating the first score and the second score based on corresponding weights for the stationary interface device priority factor and the number of subscribers priority factor.

18. A system comprising:

a mobile radio configured to permit communications over a network; and a repeater coupled to the mobile radio, the repeater comprises:

a processor;

a communication interface configured to permit communications between the repeater and at least one portable radio and to send and receive beacon signals;

a memory storing first information associated with a plurality of priority factors, the memory being coupled to the processor and further storing instructions that, when executed by the processor, cause the processor to:

extract second information associated with the plurality of priority factors from a received beacon signal sent by a second repeater in proximity to the repeater;

compare the plurality of priority factors from the extracted second information to the plurality of priority factors from the stored first information, wherein the plurality of priority factors includes a permanent primary designation priority factor and at least one other priority factor;

determine whether the repeater has priority over the second repeater based on the comparison; and designate the repeater as a primary repeater upon the determination that the repeater has priority over the second repeater.

19. The system of claim 18, wherein the at least one portable radio comprises a plurality of portable radios and the repeater, when designated as the primary repeater, facilitates communication between the plurality of portable radios and facilitates communications between the plurality of portable radios and the network via the mobile radio.

20. The system of claim 18, wherein the mobile radio and repeater are installed in a vehicle.

* * * * *